United States Patent
Bi (10) Patent No.: US 7,573,958 B2
(45) Date of Patent: Aug. 11, 2009

(54) RECEIVER FOR AND METHOD OF RECOVERING TRANSMITTED SYMBOLS IN A H-ARQ PACKET RETRANSMISSION

(75) Inventor: Hao Bi, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 1374 days.

(21) Appl. No.: 10/198,329

(22) Filed: Jul. 18, 2002

(65) Prior Publication Data

US 2004/0013213 A1 Jan. 22, 2004

(51) Int. Cl.
H03D 1/04 (2006.01)
H04L 1/00 (2006.01)
H04L 25/08 (2006.01)

(52) U.S. Cl. .................................. 375/346; 375/350

(58) Field of Classification Search ................. 375/130, 375/131, 136, 147, 148, 150, 316, 346, 350
See application file for complete search history.

(56) References Cited

U.S. PATENT DOCUMENTS

| | | | | | |
|---|---|---|---|---|---|
| 5,208,837 | A | * | 5/1993 | Richey | 375/350 |
| 5,673,294 | A | * | 9/1997 | Namekata | 375/341 |
| 5,968,197 | A | * | 10/1999 | Doiron | 714/748 |
| 6,154,443 | A | * | 11/2000 | Huang et al. | 370/210 |
| 6,175,587 | B1 | | 1/2001 | Madhow et al. | |
| 6,219,088 | B1 | | 4/2001 | Liu et al. | |
| 6,339,612 | B1 | | 1/2002 | Stewart et al. | |
| 6,344,871 | B1 | | 2/2002 | Liu et al. | |
| 6,421,803 | B1 | | 7/2002 | Persson et al. | |
| 7,212,569 | B1 | * | 5/2007 | Clark | 375/233 |
| 2001/0033614 | A1 | * | 10/2001 | Hudson | 375/229 |
| 2002/0093908 | A1 | * | 7/2002 | Yeap | 370/201 |
| 2002/0114379 | A1 | * | 8/2002 | Uesugi et al. | 375/219 |
| 2002/0171639 | A1 | * | 11/2002 | Ben-David | 345/207 |
| 2002/0176524 | A1 | * | 11/2002 | Popper et al. | 375/346 |
| 2004/0203456 | A1 | * | 10/2004 | Onggosanusi et al. | 455/67.13 |

OTHER PUBLICATIONS

Honig, M. et al. "Adaptive Techniques for Multiuser CDMA Receivers," IEEE Communication Magazine, May 2000, pp. 49-61.

Frank, C.D. et al. "Adaptive Interference Suppression for Direct-Sequence CDMA Systems with Long Spreading Codes," Proceedings of 36th Annual Allerton Conference on Communication, Control and Computing, Monticello, IL, Sep. 1998.

NTT DoCoMo "Multipath Interference Cancellation (MPIC) for HSDPA and Effect of 64QAM Data Modulation, " TSGR#118(01)0102, Jan. 2001.

(Continued)

Primary Examiner—Chieh M. Fan
Assistant Examiner—Freshteh N Aghdam (57) ABSTRACT

A receiver and method for recovering transmitted symbols in a H-ARQ packet retransmission. The method includes receiving a communication signal; determining components of the signal that are not attributed to the desired symbols; removing the unwanted components from the signal to generate a modified communication signal; determining the effective channel impulse response for the modified communication signal; generating a block filter using the effective channel impulse response; and filtering the modified communication signal using the block filter to remove the inter-code interference in the modified communication signal and recover the desired symbols.

3 Claims, 3 Drawing Sheets

OTHER PUBLICATIONS

Chan, Albert M. et al.: "A Class of Block-Iterative Equalizers for Intersymbol Interference Channels: Fixed Channel Results", 20011101; 20011100, vol. 49, No. 11, Nov. 1, 2001, pp. 1966-1976.

Samra, H et al.: Integrated iterative equalization for ARQ systems, 2002 IEEE International Conference on Acoustics, Speech, and Signal Processing, Proceedings , (ICASSP), Orlando, FL, May 13-17, 2002; [IEEE International Conference on Acoustics, Speech, and Signal Processing (ICASSP)', New York, NY: IEEE, US, vol. 3, May 13, 2002, pp. III-2781.

Baltersee, Jens: "Supplementary Partial European Search Report", European Pantent Office, Munich, Dec. 22, 2008.

* cited by examiner

RECEIVER FOR AND METHOD OF RECOVERING TRANSMITTED SYMBOLS IN A H-ARQ PACKET RETRANSMISSION

FIELD OF THE INVENTION

The present invention relates generally to the field of communication systems, and more particularly, to a receiver for and method of recovering transmitted symbols in a communication signal of a H-ARQ packet retransmission.

BACKGROUND OF THE INVENTION

High speed data service is supported in 1X EV-DV ("Physical Layer Standard for cdma2000 Spread Spectrum Systems, Release C") or HSDPA ("High Speed Downlink Packet Access: Physical Layer Aspects," 3GPP TR 25.858) by using high level modulations, such as 16-QAM, and by using multiple channelization codes with smaller spreading factors. Reception of 16-QAM modulation symbols using a conventional RAKE receiver is very vulnerable in a multipath (dispersive) environment due to inter-code and inter-symbol interferences caused by diminished orthogonality among channelization codes. These structured interferences severely limit system peak data rate/throughput. High-speed data service is, however, considered to have most application in an urban area, where multipath channel is common. Therefore, a receiver with capabilities of mitigating inter-code and inter-symbol interferences is needed. For this purpose, such a receiver is proposed in copending patent application Ser. No. 60/360,382, assigned to the same assignee as the present application.

Hybrid ARQ (H-ARQ) is an implicit link adaptation technique. In adaptive modulation and coding (AMC), explicit carrier to interference (C/I) measurements or similar measurements are used to set the modulation and coding format. In H-ARQ, link layer acknowledgements are used for re-transmission decisions. There are many schemes for implementing H-ARQ, such as, Chase combining, Rate compatible Punctured Turbo codes and Incremental Redundancy. Incremental Redundancy or H-ARQ-type-II is another implementation of the H-ARQ technique wherein instead of sending simple repeats of the entire coded packet, additional redundant information is incrementally transmitted if the decoding fails on the first attempt.

H-ARQ retransmission is used in 1X EV-DV/HSDPA if some bits in a frame are not received correctly at a mobile unit. The retransmitted frame can be an exact copy of the previous frame (Chase Combining), or a subset of the previous frame (partial Chase Combining), or a different copy with different bits (Incremental Redundancy). However, all these retransmitted frames stem from the same systematic bits, and can thus be predicted at the mobile unit. Using this extra information, an enhanced decision feedback equalization scheme can be applied during the reception of H-ARQ retransmitted frames for further performance improvements.

DETAILED DESCRIPTION OF THE DRAWINGS

The present invention provides a receiver for and method of recovering transmitted symbols in a communication signal of a H-ARQ packet retransmission. The method includes receiving a communication signal; determining unwanted components of the signal that are not attributed to desired transmitted symbols; removing the unwanted components from the signal to generate a modified communication signal; determining the effective channel impulse response; generating a block filter using the effective channel impulse response; and filtering the modified communication signal using the block filter to remove the inter-code interference in the modified communication signal and recover the desired symbols.

The receiver includes a receiver front end for receiving a transmitted signal of a H-ARQ packet retransmission and converting the transmitted signal into a baseband signal; a baseband signal processing block operatively coupled to the receiver front end for recovering transmitted symbols in the baseband signal by receiving a baseband signal, determining unwanted components of the signal that are not attributed to desired symbols, removing the unwanted components from the signal to generate a modified baseband signal, determining the effective channel impulse response, generating a block filter using the effective channel impulse response, and filtering the modified baseband signal using the block filter to remove the inter-code interference in the modified baseband signal to recover the transmitted symbols; and a back end operatively coupled to the baseband signal processing block for receiving the recovered symbols and routing the symbols to an intended application.

Figure 1:
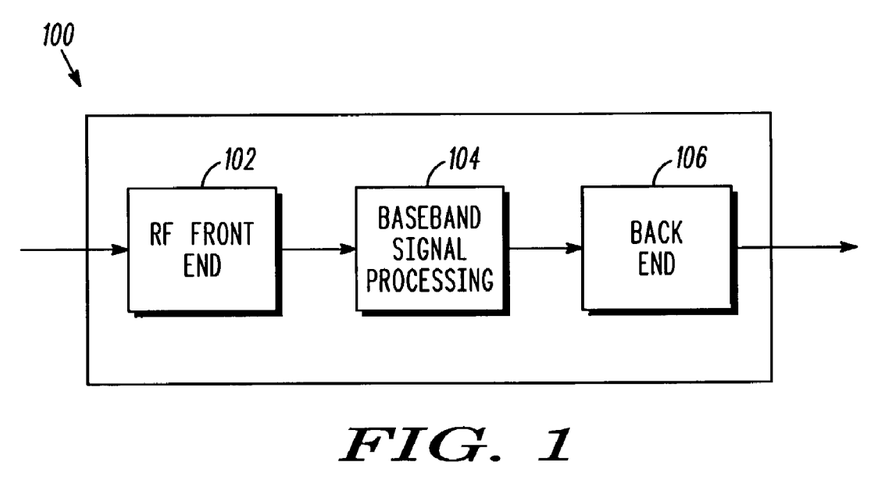
FIG. 1 is a block diagram of a pertinent part of a receiver in accordance with the preferred embodiment of the present invention.

FIG. 1 is a block diagram of a pertinent part of a receiver 100 in accordance with the preferred embodiment of the present invention. The receiver 100 may be a receiver of a mobile station, a PC card, receivers of fixed wireless system, or the like. The receiver 100 includes an RF front end 102, a baseband signal processing block 104 and a baseband back end 106. The RF front end 102 receives signals from a transmitting device and converts the signals from radio frequency (RF) passband signals into baseband signals. The baseband signal processing block 104 receives the baseband signals and processes them to recover transmitted symbols of a H-ARQ packet retransmission in accordance with the present invention. The recovered data is sent to the baseband back end 106 and output to the intended application (e.g., web browser, video service, File Transfer Protocol (FTP) service, etc.).

Let $b_k(n)$ denote the modulation symbol of code channel k at index n. The vector $b(n)_{K \times 1} = [b_1(n)\ b_2(n)\ \ldots\ b_K(n)]^T$ represents the modulation symbols of K code channels at index n. Let $s_k(n)$ denote a channelization code (combining a Walsh code with a transmitter specific scrambling code) for code channel k at symbol index n. $s_k(n)$ is a function of symbol index n when a long code (i.e., the code period is longer than a symbol duration) is used for scrambling, like in 1xEV-DV and HSDPA. $s_k(n)$ would be the same at all indices n when a short code (i.e., the code period is equal to a symbol duration) is used for scrambling. The spreading length of $s_k(n)$ is P in chips.

Channelization codes of the K channels can be grouped into a matrix $S(n)=[s_1(n)\ s_2(n)\ \ldots\ s_K(n)]_{P\times K}$. A diagonal matrix A is used to represent the amplitudes of the code channels, $$A = \begin{bmatrix} a_1 & & & & \\ & \ddots & & & \\ & & a_k & & \\ & & & \ddots & \\ & & & & a_K \end{bmatrix}$$

where $a_k$, $1\leq k\leq K$, denotes the amplitude of code channel k. Amplitudes of code channels do not change during a packet transmission, thus the matrix A and $a_k$, $1\leq k\leq K$, are not indexed by n. A transmitted baseband signal can be represented as the product of the channelization codes of K channels, the amplitudes of the code channels and the modulation symbols of the code channels, or $u(n)=S(n)\cdot A\cdot b(n)$. Let a vector $h=[h(0)\ h(1)\ \ldots\ h(L)]_{1\times(L+1)}$ represent the effective baseband channel impulse response (convolution of transmitter filter, multipath channel impulse response, and receiver filter) between the baseband transmitter (not shown in FIG. 1) and the baseband signal processing block 104, where complex variable $h(i)$, $0\leq i\leq L$, denotes the amplitude and phase response of a path at delay i, and L is the maximum delay in chip units. For simplicity of explanation, only delays in integer chips are considered herein; however, the generalization to sub-chip delays is straightforward and should be recognized by one of ordinary skill in the art. Channel matrices can then be constructed from h as $$H_l = \begin{bmatrix} h(lP) & \cdots & h(lP-P+1) \\ \vdots & \ddots & \vdots \\ h(lP+P-1) & \cdots & h(lP) \end{bmatrix}_{P\times P}, 0\leq l\leq \left\lceil \frac{L}{P} \right\rceil \quad (1)$$

where $\lceil x \rceil$ denotes the smallest integer number equal to or larger than x. With these denotations, information about $A\cdot b(n)$ is fully contained in $$y(n+m), 0\leq m\leq \left\lceil \frac{L}{P} \right\rceil,$$

which can be represented by the following series of equations, $$y(n) = H_0\cdot S(n)\cdot A\cdot b(n) + \sum_{l=0}^{\left\lceil \frac{L}{P} \right\rceil} H_l\cdot S(n-l)\cdot A\cdot b(n-l) + w(n) \quad (3)$$

$$y(n+1) = H_0\cdot S(n+1)\cdot A\cdot b(n+1) + H_1\cdot S(n)\cdot A\cdot b(n) + \sum_{l=2}^{\left\lceil \frac{L}{P} \right\rceil} H_l\cdot S(n+1-l)\cdot A\cdot b(n+1-l) + w(n+1)$$

$$\vdots$$

$$y\left(n+\left\lceil \frac{L}{P} \right\rceil\right) = \sum_{l=0}^{\left\lceil \frac{L}{P} \right\rceil - 1} H_l\cdot S\left(n+\left\lceil \frac{L}{P} \right\rceil - l\right)\cdot A\cdot b\left(n+\left\lceil \frac{L}{P} \right\rceil - l\right) + H_{\left\lceil \frac{L}{P} \right\rceil}\cdot S(n)\cdot A\cdot b(n) + w\left(n+\left\lceil \frac{L}{P} \right\rceil\right)$$

where $$H_l\cdot S(n), 0\leq l\leq \left\lceil \frac{L}{P} \right\rceil$$

causes inter-code interference, $$\sum_{\substack{l=0\\l\neq m}}^{\left\lceil \frac{L}{P} \right\rceil} H_l\cdot S(n+m-l)\cdot A\cdot b(n+m-l), 0\leq m\leq \left\lceil \frac{L}{P} \right\rceil$$

constitutes the unwanted components caused by symbols other than the desired symbols b(n), and $$w(n+m), 0\leq m\leq \left\lceil \frac{L}{P} \right\rceil$$

denotes the additive white Gaussian noise (AWGN) with covariance matrix $\sigma^2 I_{K\times K}$ (where $I_{K\times K}$ is a K×K identity matrix). Therefore, from the previous equations, $$H_m \cdot S(n) \cdot A \cdot b(n) + w(n+m) = y(n+m) - \sum_{\substack{l=0 \\ l \neq m}}^{\left\lceil \frac{L}{P} \right\rceil} H_l \cdot S(n+m-l) \cdot A \cdot b(n+m-l), \ 0 \leq m \leq \left\lceil \frac{L}{P} \right\rceil. \quad (4)$$

Let $$\overline{y}(n+m) = y(n+m) - \sum_{\substack{l=0 \\ l \neq m}}^{\left\lceil \frac{L}{P} \right\rceil} H_l \cdot S(n+m-l) \cdot A \cdot \overline{b}(n+m-l), \ 0 \leq m \leq \left\lceil \frac{L}{P} \right\rceil \quad (5)$$

(as shown by 204 in FIG. 2), where $\overline{b}(n)$ is an estimate of b(n) from previous transmission(s) of the packet and where $\overline{y}(n)$ is the baseband signal without components caused by symbols other than $\overline{b}(n)$. If $\overline{b}(n)$, the received or estimated symbol at index n, is the same as b(n), then from equations (4) and (5), $$\overline{y}(n+m) = H_m \cdot S(n) \cdot A \cdot b(n) + w(n+m) \quad 0 \leq m \leq \left\lceil \frac{L}{P} \right\rceil. \quad (6)$$

Stacking up $H_m$, $\overline{y}(n+m)$, and $w(n+m)$, $0 \leq m \leq \left\lceil \frac{L}{P} \right\rceil$ as, (7)

$$\overline{\overline{H}} = \begin{bmatrix} H_0 \\ \vdots \\ H_{\left\lceil \frac{L}{P} \right\rceil} \end{bmatrix}_{\left\lceil \frac{L}{P} \right\rceil P \times P} \quad \overline{\overline{y}} = \begin{bmatrix} \overline{y}(n) \\ \vdots \\ \overline{y}\left(n + \left\lceil \frac{L}{P} \right\rceil\right) \end{bmatrix}_{\left\lceil \frac{L}{P} \right\rceil P \times 1} \quad \overline{\overline{w}} = \begin{bmatrix} w(n) \\ \vdots \\ w\left(n + \left\lceil \frac{L}{P} \right\rceil\right) \end{bmatrix}_{\left\lceil \frac{L}{P} \right\rceil P \times 1}$$

we have $\overline{\overline{H}} \cdot S(n) \cdot A \cdot b(n) + \overline{\overline{w}} = \overline{\overline{y}}$. (8)

Figure 2:
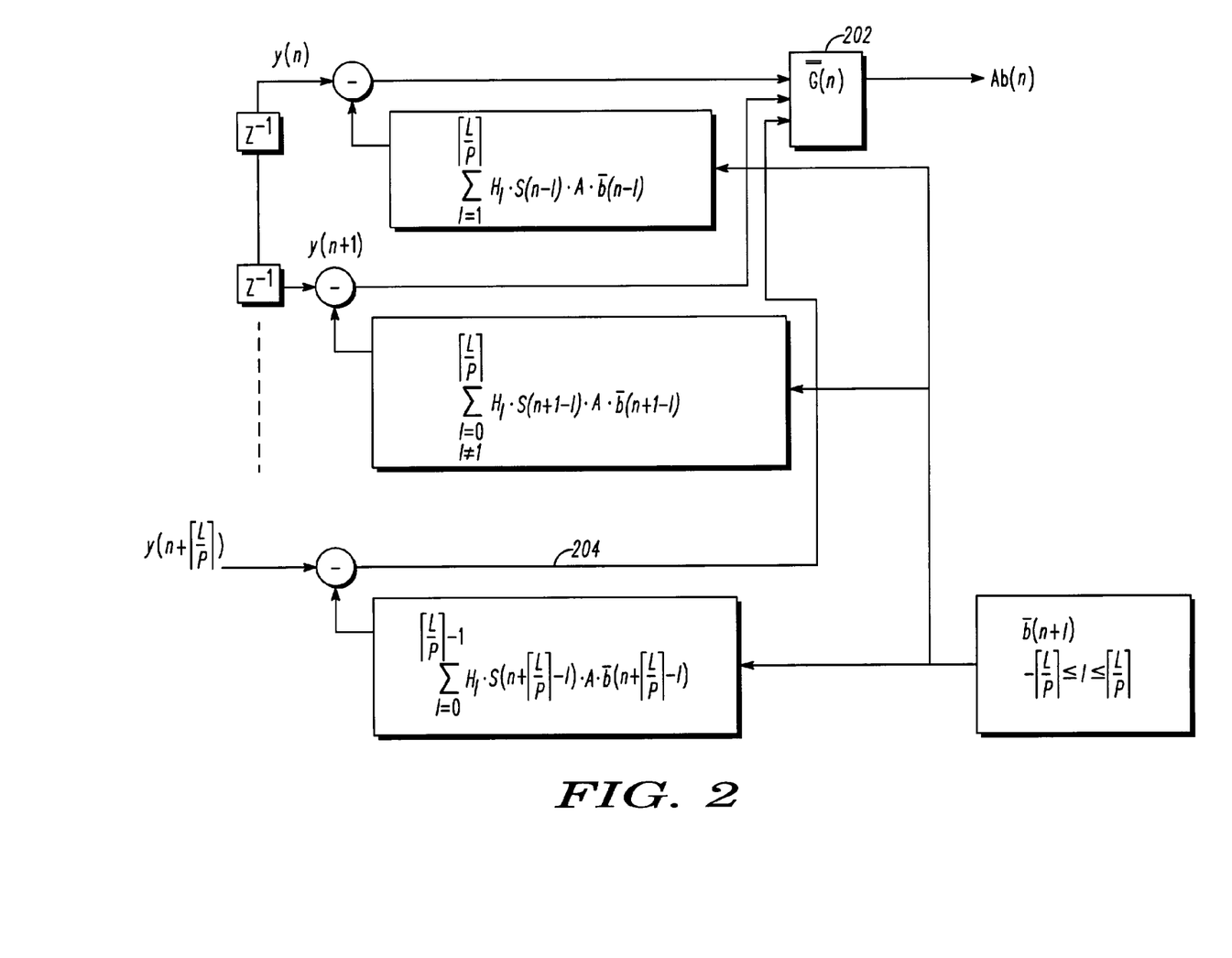
FIG. 2 is a block diagram representation of the method of recovering transmitted symbols in a communication signal of a H-ARQ packet retransmission in accordance with the preferred embodiment of the present invention.

As shown in FIG. 2 (element 202), a block filter $\overline{G}(n) = \{[\overline{\overline{H}} \cdot S(n)]^H \cdot \overline{\overline{H}} \cdot S(n)\}^{-1} \cdot [\overline{\overline{H}} \cdot S(n)]^H$ can then be used to decorrelate the received signals (remove the inter-code interference), $$\overline{G}(n) \cdot \overline{\overline{y}} = \left\{ [\overline{\overline{H}} \cdot S(n)]^H \cdot \overline{\overline{H}} \cdot S(n) \right\}^{-1} \cdot [\overline{\overline{H}} \cdot S(n)]^H \cdot \overline{\overline{y}} = \quad (9)$$

$$\left\{ [\overline{\overline{H}} \cdot S(n)]^H \cdot \overline{\overline{H}} \cdot S(n) \right\}^{-1} \cdot [\overline{\overline{H}} \cdot S(n)]^H [\overline{\overline{H}} \cdot S(n) \cdot A \cdot b(n) + \overline{\overline{w}}] =$$

$$A \cdot b(n) + \left\{ [\overline{\overline{H}} \cdot S(n)]^H \cdot \overline{\overline{H}} \cdot S(n) \right\}^{-1} \cdot [\overline{\overline{H}} \cdot S(n)]^H \cdot \overline{\overline{w}}$$

Quantities $$\overline{b}(n+l), \ -\left\lceil \frac{L}{P} \right\rceil \leq l \leq -1, \text{ and } 1 \leq l \leq \left\lceil \frac{L}{P} \right\rceil$$

used in the above operation are estimated from previous transmission(s) of the packet. Depending on code rate and combining techniques results generated from decoding previous transmission(s) of the packet are appropriately punctured. The bits in the H-ARQ packet retransmission are predicted and used in modulation to generate the estimate of $$\overline{b}(n+l), \ -\left\lceil \frac{L}{P} \right\rceil \leq l \leq -1, \text{ and } 1 \leq l \leq \left\lceil \frac{L}{P} \right\rceil.$$

Figure 3:
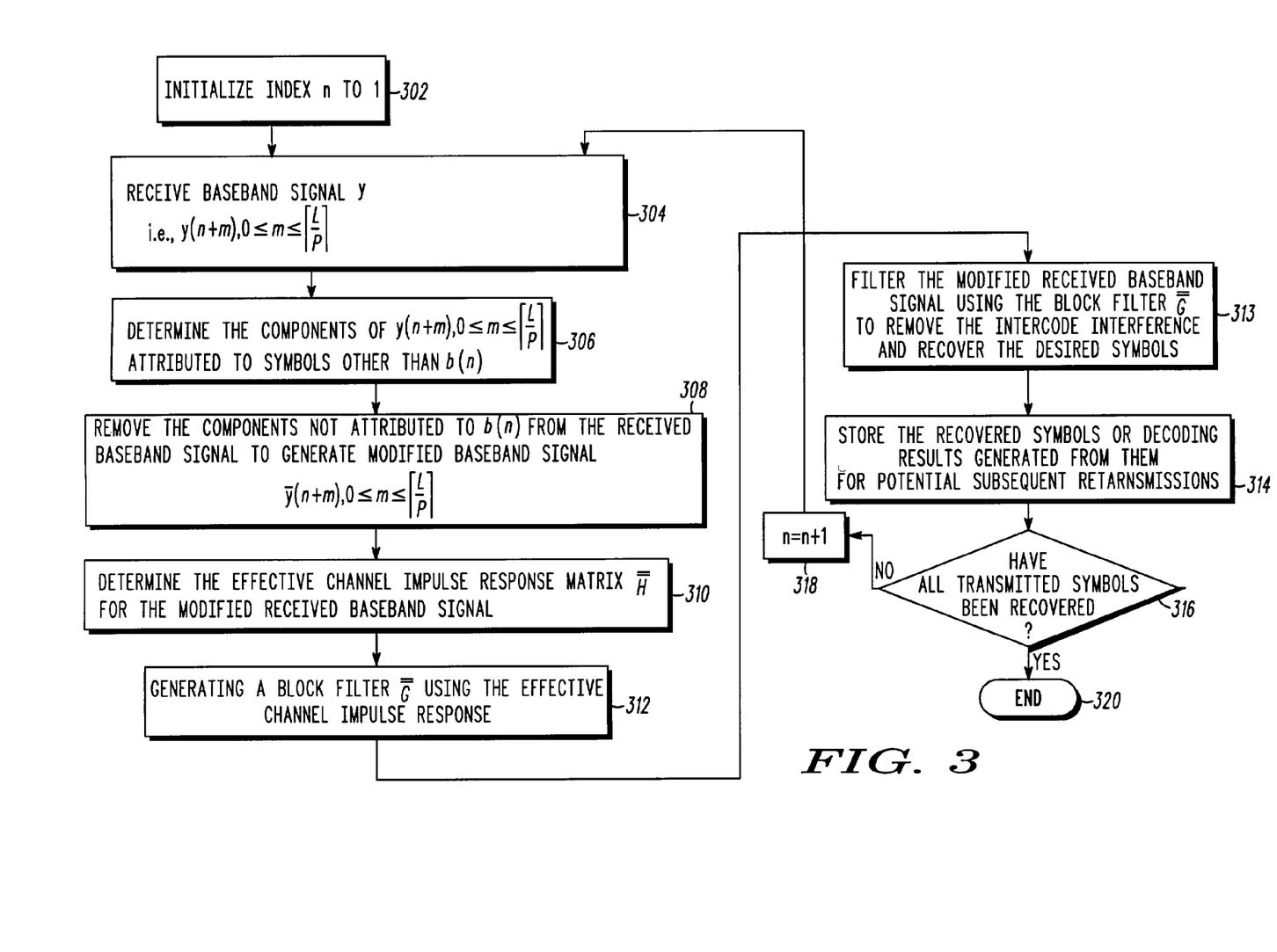
FIG. 3 is a flow diagram of the method of recovering transmitted symbols in a communication signal of a H-ARQ packet retransmission in accordance with the preferred embodiment of the present invention.

FIG. 3 is a flow diagram of the preferred embodiment of the present invention. At step 302, the method initializes index n to 1. At step 304, the method receives baseband signal:

$$y(n) = H_0 \cdot S(n) \cdot A \cdot (n) + \sum_{l=0}^{\left\lceil \frac{L}{P} \right\rceil} H_l \cdot S(n-l) \cdot A \cdot b(n-l) + w(n)$$

$$y(n+1) = H_0 \cdot S(n+1) \cdot A \cdot b(n+1) + H_1 \cdot S(n) \cdot A \cdot b(n) + \sum_{l=0}^{\left\lceil \frac{L}{P} \right\rceil} H_l \cdot S(n+1-l) \cdot A \cdot b(n+1-l) + w(n+1)$$

$$\vdots$$

$$y\left(n + \left\lceil \frac{L}{P} \right\rceil\right) = \sum_{l=0}^{\left\lceil \frac{L}{P} \right\rceil - 1} H_l \cdot S\left(n + \left\lceil \frac{L}{P} \right\rceil - l\right) \cdot A \cdot b\left(n + \left\lceil \frac{L}{P} \right\rceil - l\right) + H_{\left\lceil \frac{L}{P} \right\rceil} \cdot S(n) \cdot A \cdot b(n) + w\left(n + \left\lceil \frac{L}{P} \right\rceil\right)$$

At step 306, the method determines the components of $$y(n+m),\ 0 \le m \le \left\lceil \frac{L}{P} \right\rceil$$

that are attributed to symbols other than b(n). From the baseband signal determined in step 304, we see that: (1) the components of y(n) attributed to symbols other than b(n) are $$\sum_{l=0}^{\left\lceil \frac{L}{P} \right\rceil} H_l \cdot S(n-l) \cdot A \cdot b(n-l);$$

(2) the components of y(n+1) attributed to symbols other than b(n) are $$H_0 \cdot S(n+1) \cdot A \cdot b(n+1) + \sum_{l=0}^{\left\lceil \frac{L}{P} \right\rceil} H_l \cdot S(n+1-l) \cdot A \cdot b(n+1-l);$$

and (3) the components of $$y\left(n + \frac{L}{P}\right)$$

attributed to symbols other than b(n) are $$\sum_{l=0}^{\left\lceil \frac{L}{P} \right\rceil - 1} H_l \cdot S\left(n + \left\lceil \frac{L}{P} \right\rceil - l\right) \cdot A \cdot b\left(n + \left\lceil \frac{L}{P} \right\rceil - l\right).$$

At step 308, the method removes the components attributed to symbols other than b(n) from the received baseband signal $$y(n+m),\ 0 \le m \le \left\lceil \frac{L}{P} \right\rceil$$

to generate modified baseband signals $$\overline{y}(n+m),\ 0 \le m \le \left\lceil \frac{L}{P} \right\rceil.$$

In the preferred embodiment, the method subtracts the components determined in step 306 from the received baseband signal $$y(n+m),\ 0 \le m \le \left\lceil \frac{L}{P} \right\rceil$$

received at step 304 to generate modified baseband signal $$\overline{y}(n+m),\ 0 \le m \le \left\lceil \frac{L}{P} \right\rceil.$$

Specifically, $$\overline{y}(n) = y(n) - \sum_{l=1}^{\left\lceil \frac{L}{P} \right\rceil} H_l \cdot S(n-l) \cdot A \cdot b(n-l) = H_0 \cdot S(n) \cdot A \cdot b(n) + w(n),$$

$$\overline{y}(n+1) = y(n+1) - H_0 \cdot S(n+1) \cdot A \cdot b(n+1) - \sum_{l=2}^{\left\lceil \frac{L}{P} \right\rceil} H_l \cdot S(n+1-l) \cdot A \cdot b(n+1-l)$$

-continued $$= H_1 \cdot S(n) \cdot A \cdot b(n) + w(n+1).$$

$$\overline{y}\left(n + \left\lceil \frac{L}{P} \right\rceil\right) = y\left(n + \left\lceil \frac{L}{P} \right\rceil\right) - \sum_{l=0}^{\lceil \frac{L}{P} \rceil - 1} H_l \cdot S\left(n + \left\lceil \frac{L}{P} \right\rceil - l\right) \cdot A \cdot b\left(n + \left\lceil \frac{L}{P} \right\rceil - l\right)$$

$$= H_{\lceil \frac{L}{P} \rceil} \cdot S(n) \cdot A \cdot b(n) + w\left(n + \left\lceil \frac{L}{P} \right\rceil\right).$$

At step 310, the method determines the effective channel impulse response matrix $$\overline{H} = \begin{bmatrix} H_0 \\ \cdot \\ \cdot \\ H_{\lceil \frac{L}{P} \rceil} \end{bmatrix}_{\lceil \frac{L}{P} \rceil P \times P}.$$

At step 312, a block filter is generated as $\overline{G}(n) = \{[\overline{H} \cdot S(n)]^H \cdot \overline{H} \cdot S(n)\}^{-1} \cdot [\overline{H} \cdot S(n)]^H$. The block filter can then be used to decorrelate the received signal at step 313. In particular, at step 313, the method filters the stacked modified received baseband signal, that is generated from the modified baseband signal at step 308 as $$\overline{y} = \begin{bmatrix} \overline{y}(n) \\ \cdot \\ \cdot \\ \overline{y}\left(n + \left\lceil \frac{L}{P} \right\rceil\right) \end{bmatrix}_{\lceil \frac{L}{P} \rceil P \times 1},$$

in order to remove the inter-code interference to recover the transmitted symbols. That is, block filter $\overline{G}(n)$ is multiplied by the stacked modified received baseband signal $\overline{y}$ to produce the transmitted symbols as follows:

$$A\overline{b}(n) = \overline{G}(n) \cdot \overline{y}$$

$$= \left\{ [\overline{H} \cdot S(n)]^H \cdot \overline{H} \cdot S(n) \right\}^{-1} \cdot [\overline{H} \cdot S(n)]^H \cdot \overline{y}$$

$$= \left\{ [\overline{H} \cdot S(n)]^H \cdot \overline{H} \cdot S(n) \right\}^{-1} \cdot [\overline{H} \cdot S(n)]^H [\overline{H} \cdot S(n) \cdot A \cdot b(n) + \overline{w}]$$

$$= A \cdot b(n) + \left\{ [\overline{H} \cdot S(n)]^H \cdot \overline{H} \cdot S(n) \right\}^{-1} \cdot [\overline{H} \cdot S(n)]^H \cdot \overline{w}$$

where $\overline{b}(n)$ are the recovered symbols.

Next, at step 314, the method stores the recovered symbols $\overline{b}(n)$ or decoding results generated from them to be used in recovering symbols in subsequent retransmissions. At step 316, the method determines whether all transmitted symbols have been recovered. In the preferred embodiment, the method determines whether "n" is equal to the length of the packet. When "n" is equal to the length of the packet, all symbols have been recovered and the method ends at step 320. When "n" is not equal to the length of the packet, the method increases "n" at step 318 and proceeds to step 304 to repeat the recovery process.

This invention proposes a method of using the information obtained from the previous transmission of a packet to help recover symbols in the H-ARQ retransmission of the packet. By using the information obtained from the previous transmission of the packet, enhanced decision feedback equalization as described in this invention can be used to better recover symbols from inter-code and inter-symbol interference. This can improve the performance of the receiver, and eventually increase the capacity of the network.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method of recovering transmitted symbols in a communication signal of a H-ARQ packet retransmission comprising:
    receiving a communication signal;
    determining inter-symbol interference components of the signal, wherein the inter-symbol interference components are estimated using previous transmissions of the packet;
    removing the inter-symbol interference components from the signal to generate a modified communication signal;
    determining an effective channel impulse response;
    generating a block filter using the effective channel impulse response by determining
    $\overline{G}(n) = \{[\overline{H} \cdot S(n)]^H \cdot \overline{H} \cdot S(n)\}^{-1} \cdot [\overline{H} \cdot S(n)]^H$, where $S(n)$ represents channelization codes and $\overline{H}$ represents the effective channel impulse response; and
    filtering the modified communication signal using the block filter to remove inter-code interference in the modified signal and recover desired symbols of the modified signal.

2. The method of claim 1 wherein the step of filtering the modified communication signal comprises multiplying block filter $\overline{G}(n) = \{[\overline{H} \cdot S(n)]^H \cdot \overline{H} \cdot S(n)\}^{-1} \cdot [\overline{H} \cdot S(n)]^H$ by a stacked modified baseband $$\text{signal } \overline{y} = \begin{bmatrix} \overline{y}(n) \\ \vdots \\ \overline{y}\left(n + \left\lceil \frac{L}{P} \right\rceil\right) \end{bmatrix}_{\lceil \frac{L}{P} \rceil \cdot P \times 1}$$

to recover the desired symbols, where $S(n)$ represents channelization codes $\overline{y}(n)$ is a baseband signal without components caused by symbols other than $\overline{b}(n)$, where $\overline{b}(n)$ is an estimate of $b(n)$, the desired symbols, from previous transmissions of the packet and $\lceil L/P \rceil$ represents a maximum number of symbols contributing to inter-symbol interference.

3. A receiver comprising:

a receiver front end for receiving a transmitted signal and converting the signal into a baseband signal;

a baseband signal processing block operatively coupled to the receiver front end for recovering transmitted symbols in a communication signal of a H-ARQ packet retransmission by receiving the baseband signal;

determining inter-symbol interference components of the baseband signal, wherein the inter-symbol interference components are estimated using previous transmissions of the packet; removing the inter-symbol interference components from the baseband signal to generate a modified communication signal; determining an effective channel impulse response;

generating a block filter using the effective channel impulse response by determining $\overline{G}(n) = \{[\overline{H} \cdot S(n)]^H \cdot \overline{H} \cdot S(n)\}^{-1} \cdot [\overline{H} \cdot S(n)]^H$, where $S(n)$ represents channelization codes and $\overline{H}$ represents the effective channel impulse response; and filtering the modified communication signal using the block filter to remove inter-code interference in the modified signal and recover desired symbols of the modified signal; and a back end operatively coupled to the baseband signal processing block for receiving the recovered symbols and routing the symbols to an intended application.

\* \* \* \* \*